(12) United States Patent
Dine et al.

(10) Patent No.: US 7,211,002 B2
(45) Date of Patent: May 1, 2007

(54) HIGH ANGLE CONSTANT VELOCITY JOINT

(75) Inventors: Donald W. Dine, Rochester Hills, MI (US); Noel W. Sutton, Auburn Hills, MI (US); John A. Ramey, St. Clair Shores, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 252 days.

(21) Appl. No.: 10/970,553

(22) Filed: Oct. 21, 2004

(65) Prior Publication Data

US 2006/0009298 A1    Jan. 12, 2006

Related U.S. Application Data

(63) Continuation-in-part of application No. 10/294,197, filed on Nov. 14, 2002, now Pat. No. 6,817,950.

(51) Int. Cl.
*F16D 3/224* (2006.01)
(52) U.S. Cl. ........................ 464/145; 464/906
(58) Field of Classification Search ........ 464/144–146, 464/906
See application file for complete search history.

(56) References Cited

U.S. PATENT DOCUMENTS

| | | | |
|---|---|---|---|
| 3,447,341 A | 6/1969 | Miller, Jr. | |
| 5,242,329 A | 9/1993 | Jacob | |
| 6,149,524 A | 11/2000 | Jacob et al. | |
| 6,280,337 B1 | 8/2001 | Wormsbaecher et al. | |
| 6,383,082 B1 | 5/2002 | Declas | |
| 6,461,244 B2 | 10/2002 | Meyer et al. | |
| 7,090,583 B1 * | 8/2006 | Dine | 464/145 |
| 2002/0077185 A1 | 6/2002 | Meyer et al. | |
| 2004/0097292 A1 | 5/2004 | Dine | |

FOREIGN PATENT DOCUMENTS

| | | |
|---|---|---|
| DE | 197 22 141 A1 | 5/1999 |
| WO | WO 2005/042995 A1 | 5/2005 |

OTHER PUBLICATIONS

PCT Notification of Transmittal of the International Search Report and the Written Opinion of the International Searching Authority, Jan. 17, 2006, 3 pages.
PCT International Search Report by the International Searching Authority of the European Patent Office, Jan. 17, 2006, 5 pages.
PCT Written Opinion of the International Searching Authority of the European Patent Office, Jan. 17, 2006, 6 pages.

\* cited by examiner

*Primary Examiner*—Greg Binda
(74) *Attorney, Agent, or Firm*—Jennifer M. Brumbaugh; Mick A. Nylander

(57) ABSTRACT

A constant velocity joint is provided that includes an outer race having a bore with an inner surface, a cage arranged within the bore of the outer race, an inner race having an outer surface, a plurality of balls arranged within the cage, and a shaft connected to the inner race. The cage, outer race, inner race, and balls interrelate to center and support the cage. The cage remains in a non-supporting state with the outer race and the inner race through a no angle and a high angle position of the shaft.

4 Claims, 19 Drawing Sheets

HIGH ANGLE CONSTANT VELOCITY JOINT

RELATED APPLICATIONS

This application is a continuation-in-part of U.S. patent application Ser. No. 10/294,197 filed on Nov. 14, 2002 now U.S. Pat. No. 6.817.950 issued on Nov. 16, 2004.

BACKGROUND

Constant velocity joints (CV joints) are common components in automotive vehicles. Typically, constant velocity joints are employed where transmission of a constant velocity rotary motion is desired or required. Common types of constant velocity joints are a plunging tripod, a fixed tripod, a plunging ball joint, and a fixed ball joint. These joints can be used in front wheel drive vehicles, or rear wheel drive vehicles and on the propeller shafts found in rear wheel drive, all wheel drive and four wheel drive vehicles. The plunging constant velocity joints allow for axial movement during operation without the use of slip splines, but they sometimes initiate forces that result in vibration and noises. Plunging-type CV joints allow angular displacement along with the axial displacement along two axes thereof. The fixed-type constant velocity joints generally only allow angular displacement between two axes. The fixed constant velocity joints are better situated for higher operating angles than that of a plunging-type constant velocity joint. All of these constant velocity joints are generally grease lubricated for life and sealed by a sealing boot when used on shafts. Thus, the constant velocity joints are sealed in order to retain grease inside the joint while keeping contaminates and foreign matter, such as dirt and water, out of the joint. The sealing protection of the constant velocity joint is necessary because contamination of the inner chambers causes internal damage and destruction of the joint which increases heat and wear on the boot, thus possibly leading to premature boot and grease failures and hence failure of the overall joint. The problem of higher temperatures in high speed fixed constant velocity joint is greatly enhanced at the higher angles. Thus, the increased temperatures and increased stresses on the boot caused by higher angles may result in premature failures in conventional constant velocity joints.

Generally, conventional fixed-type constant velocity joints included a bulky and heavy outer race having a spherical inner surface and a plurality of grooves. The joints also include an inner race, having a spherical outer surface with guide grooves formed therein. Many conventional fixed-type constant velocity joints use six torque-transmitting balls, which are arranged between the grooves of the outer and inner races of the constant velocity joint by a cage retainer. The balls allow a predetermined displacement angle to occur through the joint and thereby transmit a constant velocity rotary motion through the shafts of the automotive driveline system.

SUMMARY

A constant velocity joint is provided that includes an outer race having a bore with an inside surface, a cage arranged within the bore of the outer race, an inner race having an outer surface, a plurality of balls arranged within the cage, and a shaft connected to the inner race. The cage, outer race, inner race, and balls interrelate to center and support the cage. The cage remains in a non-supporting state with the outer race and the inner race through a no angle and a high angle position of the shaft.

DETAILED DESCRIPTION

Figure 1:
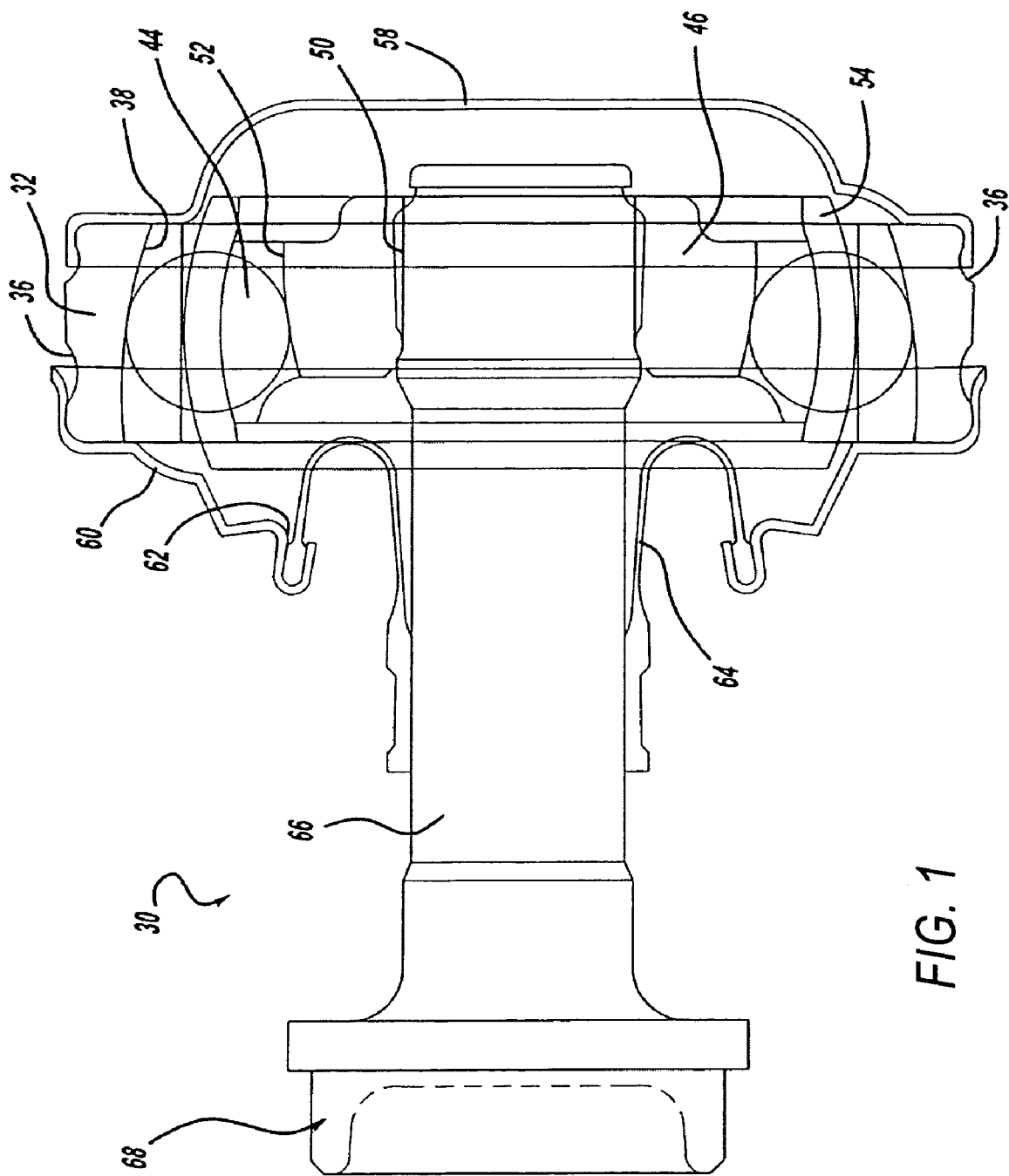
FIG. 1 shows a side view of a constant velocity joint according to the present invention.

Referring to the drawings, a constant velocity joint 30 according to the present invention is shown. It should be noted that any type of constant velocity joint, such as a plunging tripod, a fixed tripod, and the like may incorpate some or all of the various features of the present invention described herein. In one aspect, the constant velocity joint 30 according to the present invention generally is a high angle, high speed, ball type fixed constant velocity joint for use on a propeller shafts or driveshafts. The high angle can be defined as anything greater than or equal to nine degrees. These high angle joints tend to operate at high speeds and high temperatures.

A typical driveline for an all wheel drive vehicle includes a plurality of constant velocity joints 30. However, it should be noted that the present invention can also be used with rear wheel drive only vehicles, front wheel drive only vehicles, all wheel drive vehicles, and four wheel drive vehicles. Generally, a driveline includes an engine that is connected to a transmission and a power takeoff unit. A front differential may have a right hand side shaft and a left hand side shaft, each of which are connected to a wheel and deliver power to the wheels. On both ends of the right hand front side shaft and left hand front side shaft are constant velocity joints. A propeller shaft connects the front differential and the rear differential to the transfer case or power take-off unit. The rear differential may include a right hand rear side and a left hand rear side shaft, each of which ends with a wheel on an end thereof. Generally, a CV joint is located on both ends of the half shaft that connect to the wheel and the rear differential. The propeller shaft generally may be a multi-piece propeller shaft that includes a plurality of Carden joints and/or high speed constant velocity joints 30. The constant velocity joints 30 transmit power to the wheels through the driveshaft even if the wheels or the shaft have changing angles due to steering, raising or lowering of the suspension of the vehicle, etc. The constant velocity joint 30 may be of any of the standard types known, such as plunging tripod, a cross groove joint, a fixed joint, or a fixed tripod joint all of which are commonly known terms in the art for different varieties of constant velocity joints. The constant velocity joints allow for transmission of constant velocities at a variety of angles which are found in everyday driving of automotive vehicles on both the half shafts and propeller shafts of these vehicles.

Figure 2:
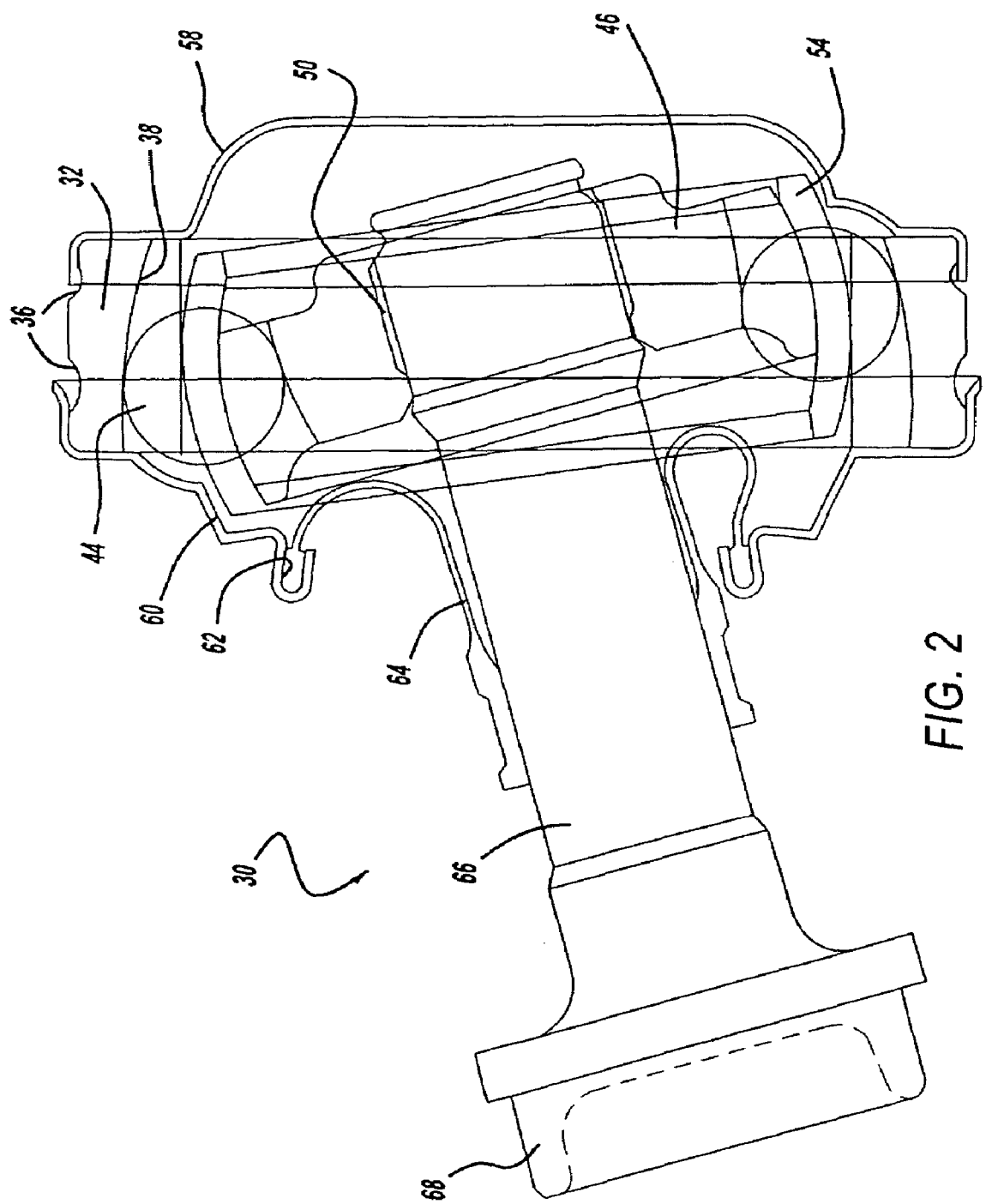
FIG. 2 shows a side view of a constant velocity joint articulated to a predetermined angle according to the present invention.
Figure 17:
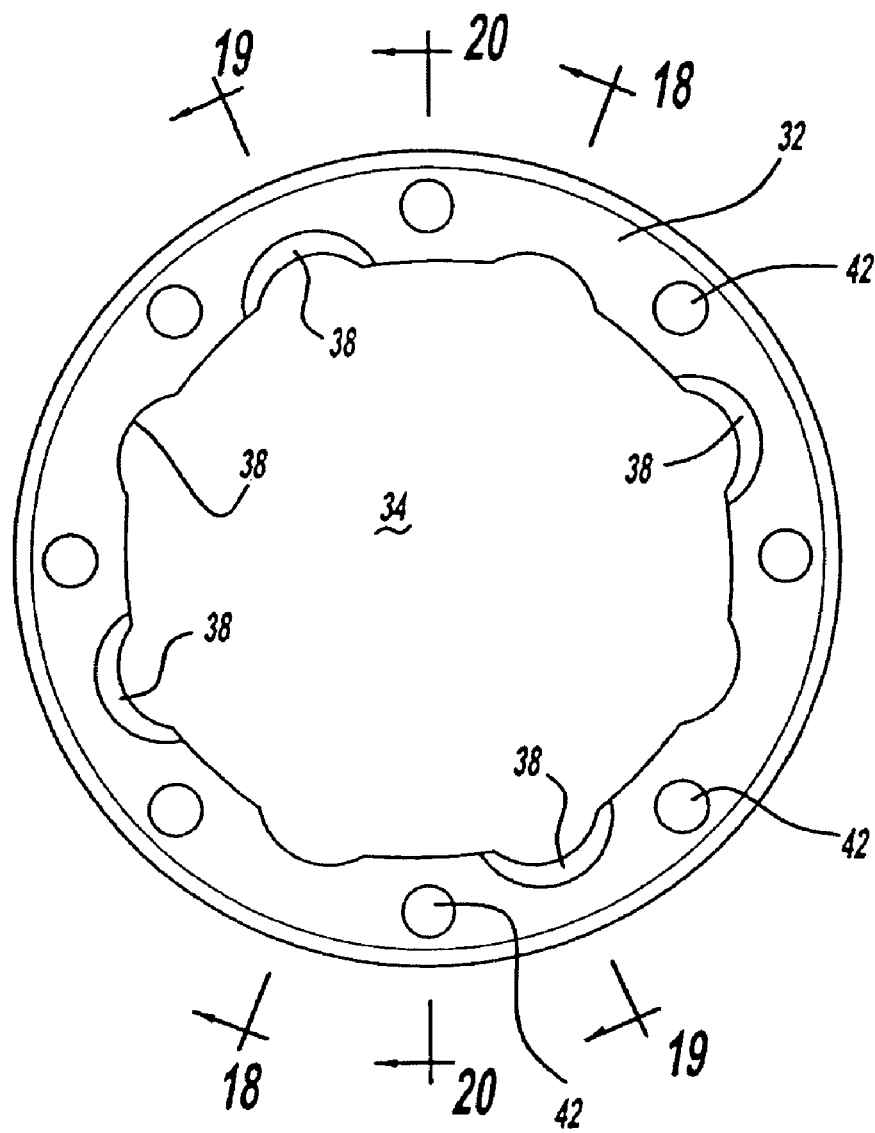
FIG. 17 shows a top view of an outer race according to the present invention.
Figure 16:
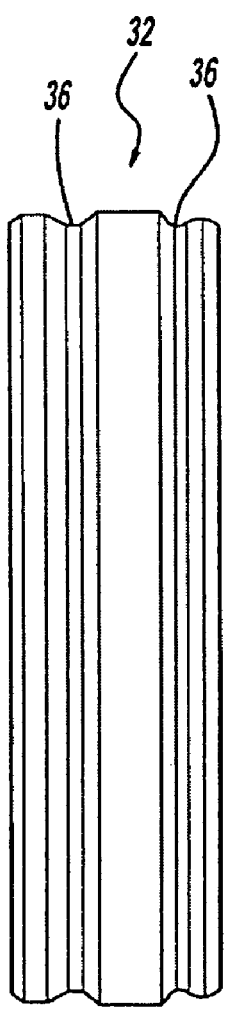
FIG. 16 shows a side view of an outer race according to the present invention.
Figure 19:
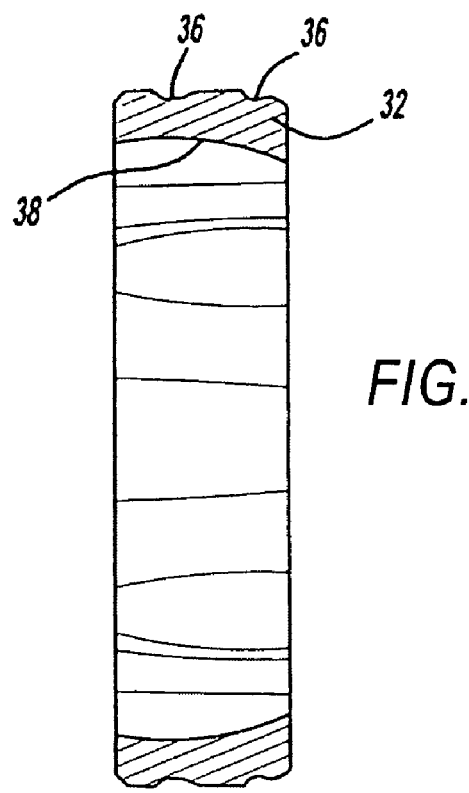
FIG. 19 shows a cross section of an outer race according to the present invention taken along line 19—19 of FIG. 17.
Figure 18:
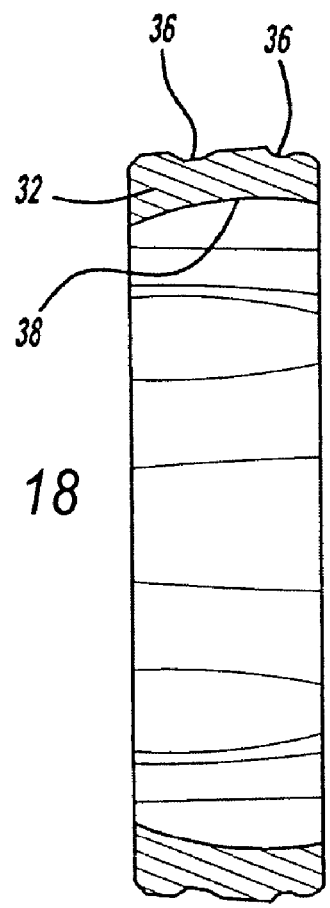
FIG. 18 shows a cross section of the outer race according to the present invention taken along line 18—18 of FIG. 17.
Figure 20:
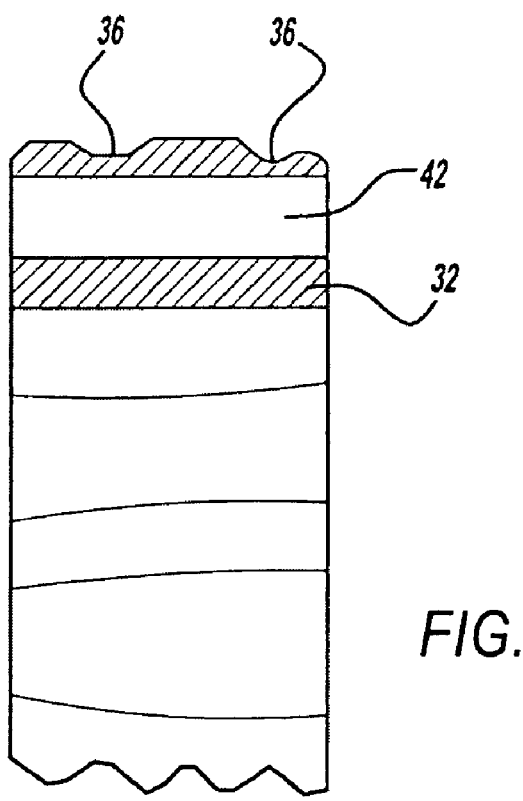
FIG. 20 shows a cross section of the outer race taken along line 20—20 of FIG. 17.
Figure 21:
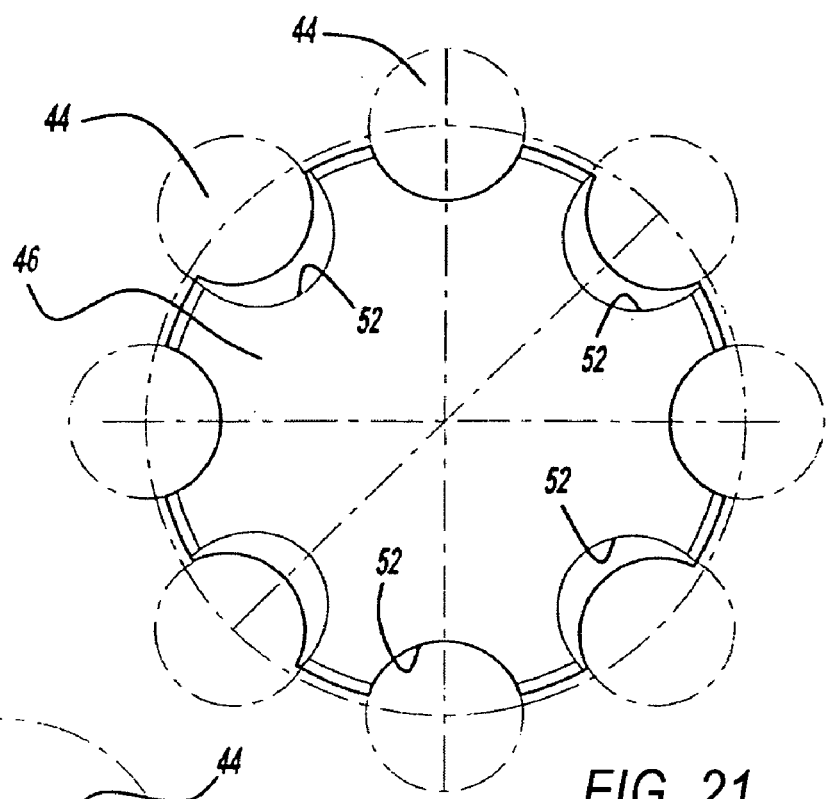
FIG. 21 shows a plan view of the inner race with a plurality of balls set therein.
Figure 22:
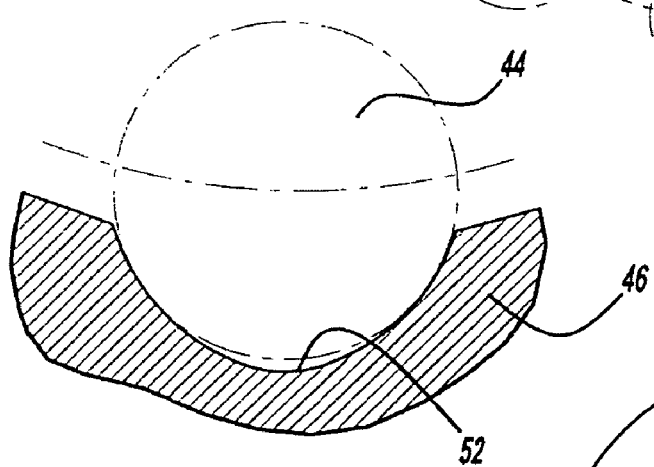
FIG. 22 shows a close-up view of a ball track with a ball therein according to the present invention.
Figure 23:
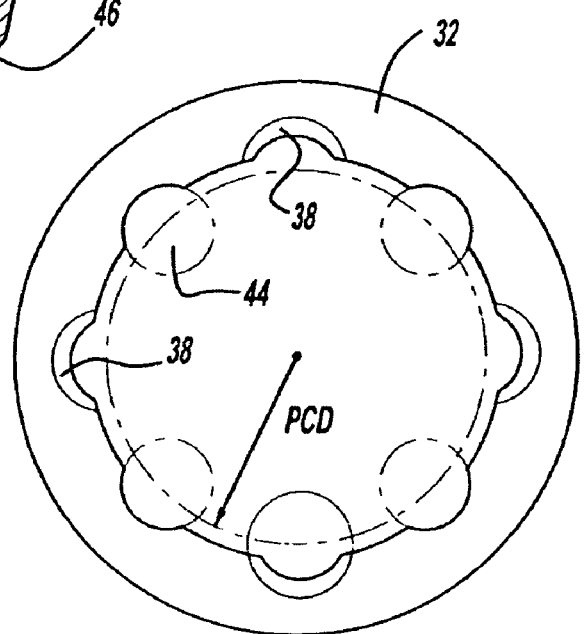
FIG. 23 shows a top view of the outer race with a plurality of balls therein.

FIGS. 1 through 23 show one embodiment of the present invention. A high speed, high angle constant velocity joint 30 is generally shown in FIGS. 1 and 2. The constant velocity joint 30 includes an outer race 32 generally having a circumferential shaped bore 34 (see FIG. 17) therethrough. The outer race 32 generally has a ring like appearance. On an outer surface of the constant velocity joint outer race 32 is located at least one circumferential channel 36 around the entire outer periphery of the outer race 32. The outer race 32 also includes a plurality of mounting orifices 42 equidistantly located around an outer periphery thereof. The outer race 32 is generally made of a steel material, however it should be noted that any other type of metal material, hard ceramic, plastic, composite material, and the like may also be used for the outer race 32. The material is preferably able to withstand the high speeds, temperatures and contact pressures of the constant velocity joint 30. The outer race 32 also includes a plurality of axially opposed ball tracks 38 located on an inner surface thereof. The tracks 38 are axially opposed such that one half of the ball tracks 38 open to a side of the outer race 32 opposite to that of the other half of the ball tracks 38. Therefore, the axial slope of the ball tracks 38 lay opposite to one another in the axial direction in an alternating pattern in this one embodiment. This will ensure a decrease in cage forces, reduction of at least one of the guidance spheres, and will also improve the efficiency and thermal characteristics of the constant velocity joint 30. In the present invention, the ball tracks 38 may also be of a gothic or elliptical shape provided pressure angle and conformity are maintained.

It should be noted that, in one aspect, the constant velocity joint outer race 32 is thinner than the outer races of conventional constant velocity joints. This will help reduce the weight of the outer race 32 while also reducing the package size of the constant velocity joint 32. In one embodiment, the outer race 32 is approximately twenty four mm in thickness, but may be any width less than one hundred fifty mm for a disc style joint but may be much greater than that for a monoblock style joint depending on the design requirements for the automotive vehicle.

The ball tracks 38 on the inner surface of the outer race 32 also are double offset tracks. The double offset tracks 32 incorporate both a radial offset 43 in addition to an axial offset 41. This will flatten the ball tracks 38 and promote rolling, therefore improving efficiency and durability of the constant velocity joint 30. It should be noted that the flattened tracks 38 also result in better track edge support. This permits a higher pressure angle and a closer conformity of the ball 44 to the track 38. This will allow the joint 30 to articulate to a higher angle than that of the conventional joints while maintaining superior durability. The axial offset 41 and radial offset 43 (see FIG. 19) have values, that along with the pitch circle diameter (PCD), which is defined as the midpoint of a ball 44 on one side to the midpoint of a ball 44 on the other side through a center point of the joint 30, have predetermined ratios. The predetermined ratios of the axial offset 41, radial offset 43 and the pitch circle diameter (PCD) allow for better ball rolling and increased efficiency of the constant velocity joint 30. It should be noted that in the embodiment shown in the drawings is a four plus four constant velocity joint 30, which has a total of eight balls in the constant velocity joint 30. However, it should be noted that it is contemplated to make a ten ball, six ball, or four ball joint incorporating some or all of the features of the constant velocity joint 30 of the present invention.

The constant velocity joint 30 also includes an inner race 46 generally having a circumferential shape. The inner race is arranged within the bore 34 of the outer race 32. The inner race 46 includes an inner bore 48 (see FIG. 17) and has a plurality of ball tracks 52 that are axially opposed. The ball tracks 52 generally have a spherical shape and are aligned with the ball tracks 38 on the outer race 32 such that the axial angle will open in a similar or the same direction as the ball track 38 directly aligned above it on the outer race 32. The ball tracks 52 on the outer spherical surface of the inner race 46 have one half of the ball tracks 52 axially oriented in one way while the other half of the ball tracks 52 are axially oriented in the opposite direction. In the embodiment shown, the ball tracks 52 will open in an alternating pattern around the outer circumference of the inner race 46. The ball tracks 52 with the spherical or elliptical shape on the inner race 46 also include a double offset that includes both a radial offset 43 and an axial offset 41 (see FIG. 19) to promote a flattening of the spherical tracks 52. This leads to improved efficiency and durability of the constant velocity joint 30 as discussed above for the outer race 32. It should be noted that in one embodiment the inner race 46 is made of steel. However, any other, metal composite, hard plastic, ceramic, and the like may also be used.

The constant velocity joint 30 includes a roller cage 54 generally having a ring like appearance. The roller cage 54 is arranged within the bore 34 of the outer race 32 such that it is not in contact with the inner surface of the outer race 32. The cage 54 has a plurality of oblong shaped orifices 56 through a surface thereof. The number of orifices 56 will match the number of ball tracks 38, 52 on the outer race 32 and inner race 46 of the constant velocity joint 30. In one embodiment such as that shown in the drawings there will be eight orifices 56 (see FIG. 11) therethrough. The cage 54 is centered and supported solely by the outer spherical surface of the inner race 46. The use of axially opposed tracks allows the cage 54 to be centered while maintaining a predetermined distance from the edge surfaces of the outer race 32. This insures that the constant velocity joint 30 is symmetrical in nature. This will allow for an approximate 20% efficiency improvement of the constant velocity joint 30. With no contact between the outer race 32 inner surface and the outer surface of the cage 54, efficiency is improved at an approximate rate as noted above, thereby reducing the likelihood of boot and grease thermal failures. The cage 54 is also designed such that it does not have cage grooves that would weaken the cage 54. This allows the inner race 46 to be assembled within the cage 54 without the use of the specialized cage grooves. The cage 54 along with the inner race 46 are preferably made of a steel materials but any other hard metal material, plastic, composite, ceramic, and the like may also be used. The cage 54 in the present invention is nearly in equilibrium and therefore most of the contact loads cancel each other out. This will also help increase the efficiency of the constant velocity joint 30.

The constant velocity joint 30 includes a plurality of balls 44. The balls 44 generally have a larger diameter than balls of traditional CV joints. The larger diameter is permitted since the assembly angle is smaller for the constant velocity joint 30 than for most of the current art. The use of the larger diameter balls 44 also reduces the contact stress on the tracks 38, 52 of the inner race 46 and the outer race 32. The larger diameter balls 44 are each arranged within one of the orifices 56 of the cage 54 and within ball tracks 38, 52 of the outer race 32 and of the inner race 46. Therefore, the balls 44 will be capable of rolling in the axially opposed tracks 38, 52 aligned in the same direction. The use of the double offset means that the radial path the balls travel is shallower thus allowing for a higher angle in a smaller, lighter constant velocity joint 30.

Figure 3:
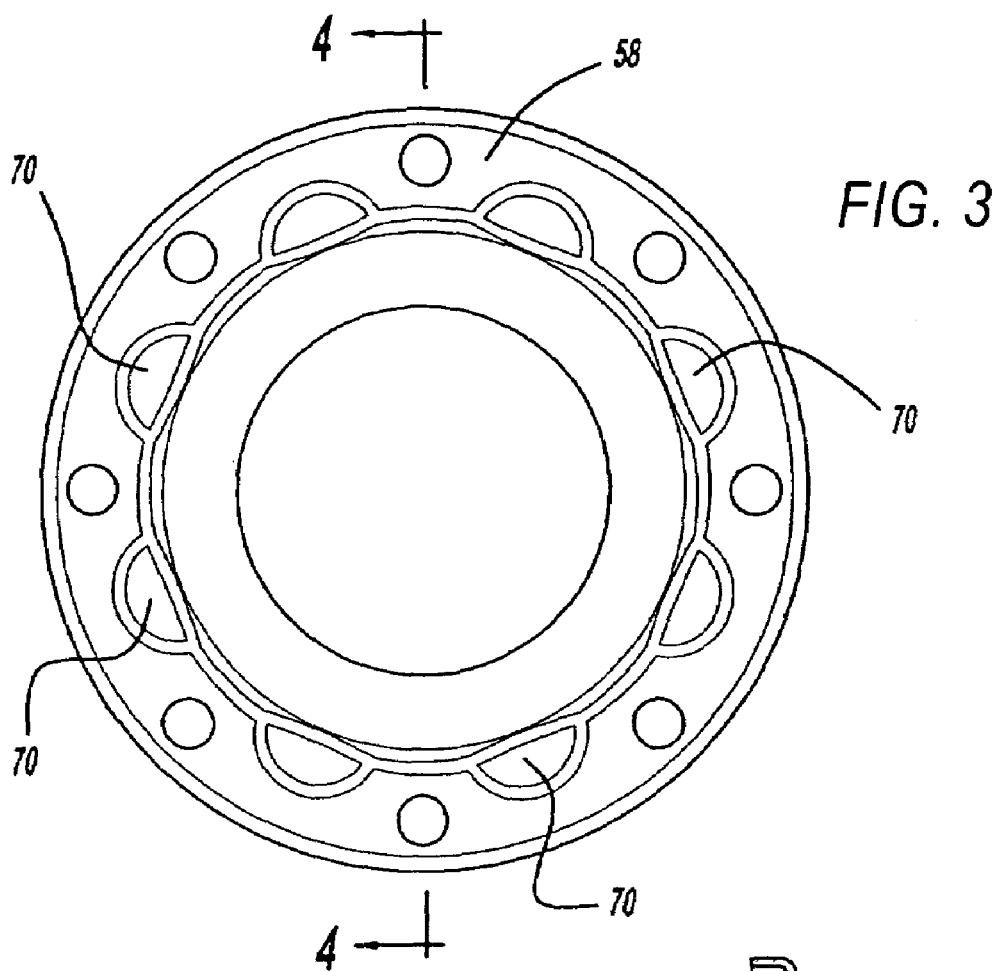
FIG. 3 shows a top view of a grease cap according to the present invention.
Figure 4:
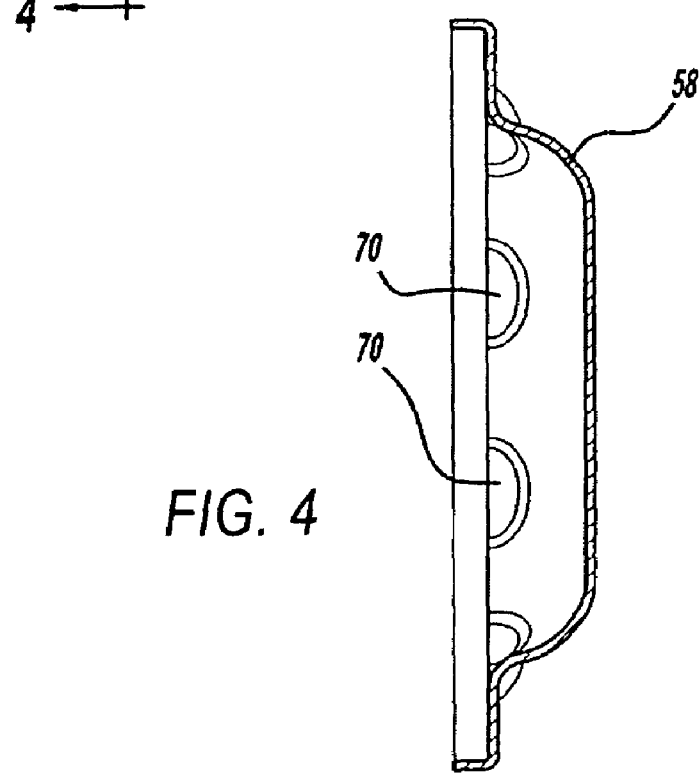
FIG. 4 shows a cross section taken along line 4—4 of FIG. 3 of a cover according to the present invention.
Figure 5:
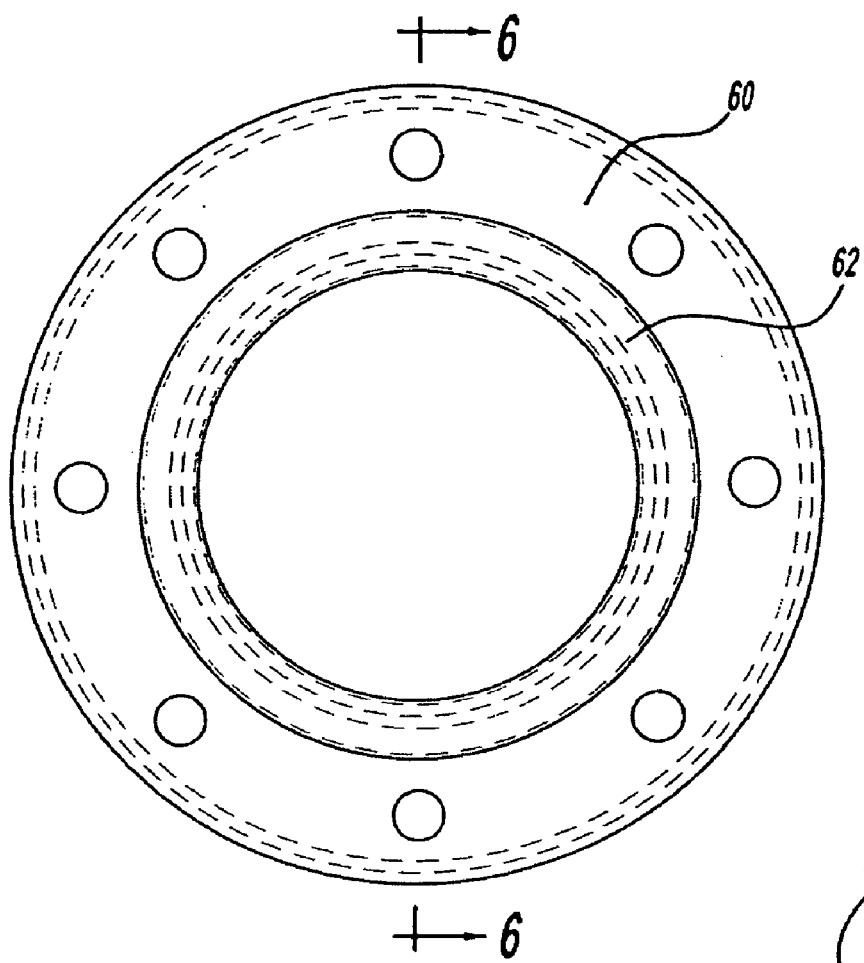
FIG. 5 shows a top view of a boot cover according to the present invention.
Figure 6:
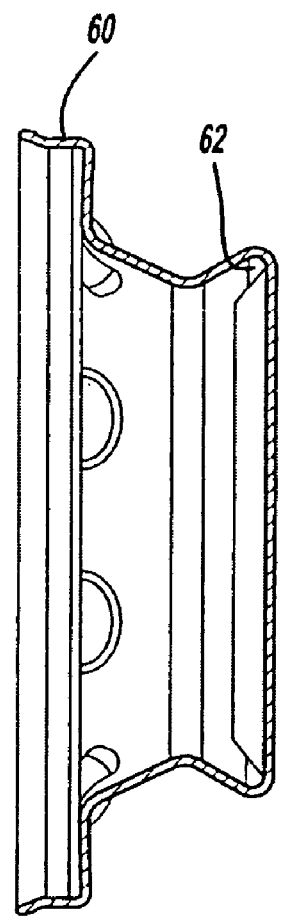
FIG. 6 shows a cross section taken along line 6—6 of FIG. 5 of a boot cover according to the present invention.
Figure 7:
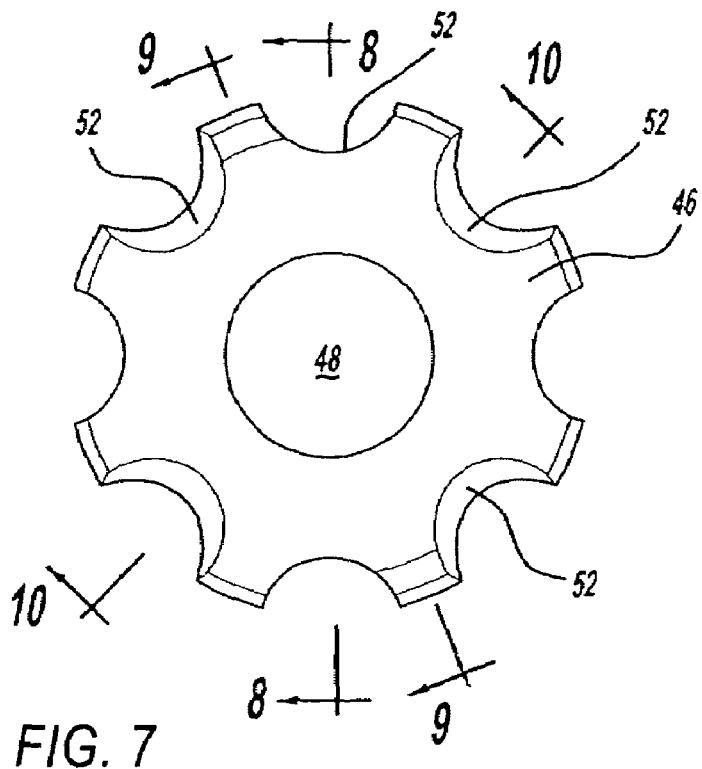
FIG. 7 shows a top view of an inner race according to the present invention.
Figure 8:
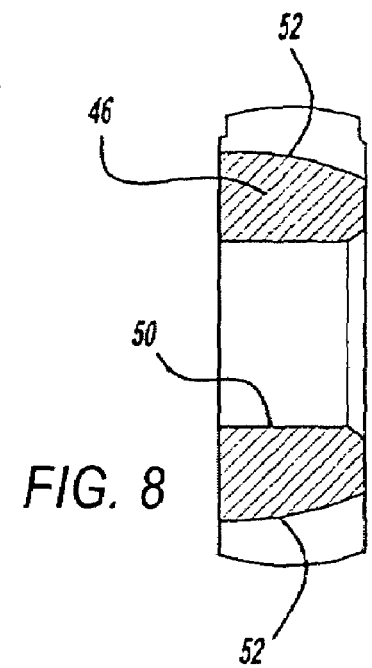
FIG. 8 shows a cross section of the inner race taken along line 8—8 of FIG. 7 according to the present invention.
Figure 9:
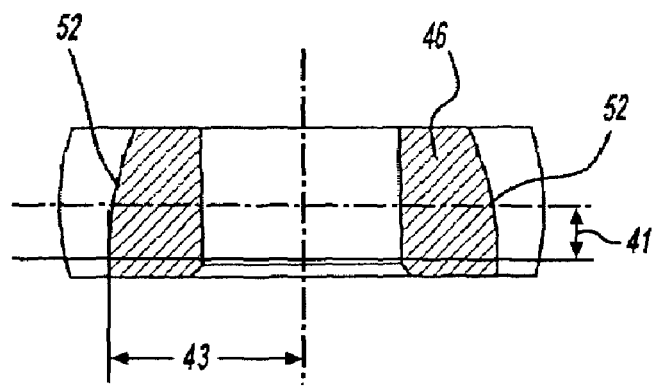
FIG. 9 shows a cross section of an inner race taken along line 9—9 of FIG. 7 according to the present invention.
Figure 10:
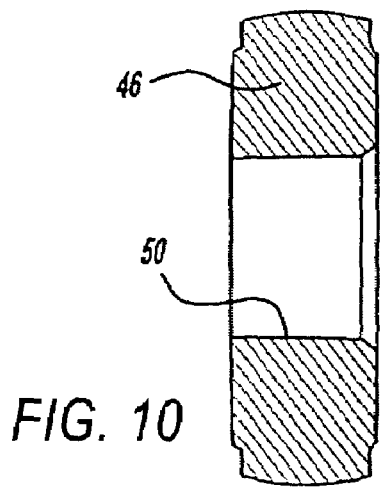
FIG. 10 shows a cross section of an inner race taken along line 10—10 of FIG. 7 according to the present invention.
Figure 11:
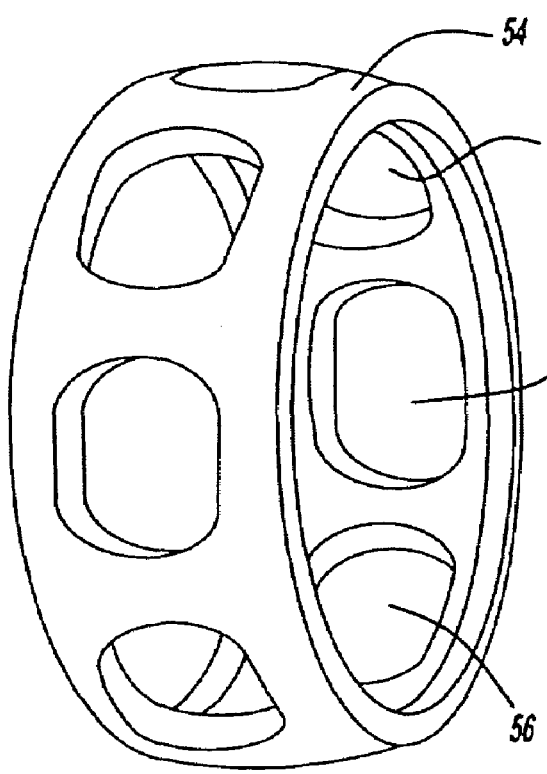
FIG. 11 shows a plan view of a cage according to the present invention.
Figure 12:
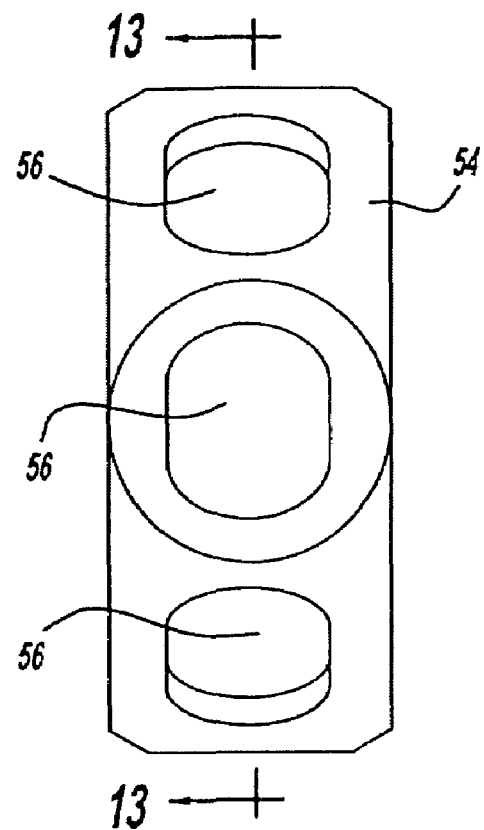
FIG. 12 shows a side view of a cage according to the present invention.
Figure 13:
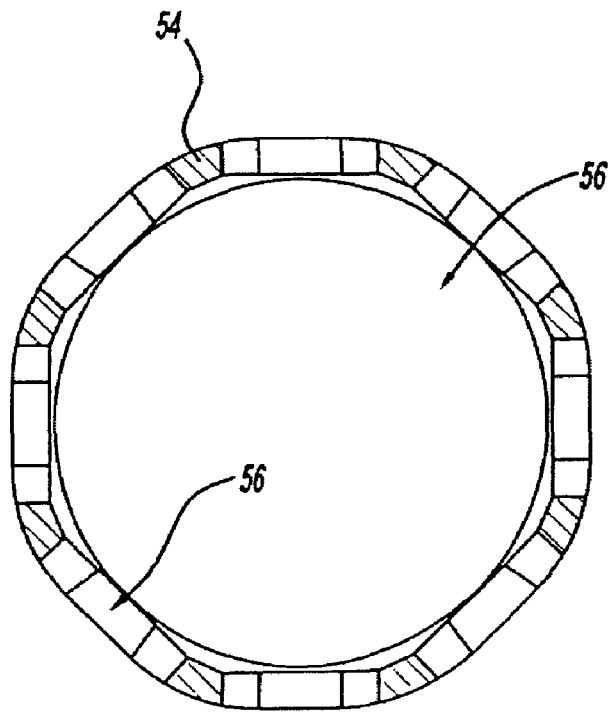
FIG. 13 shows a cross section of the cage according to the present invention taken along line 13—13 of FIG. 12 according to the present invention.
Figure 14:
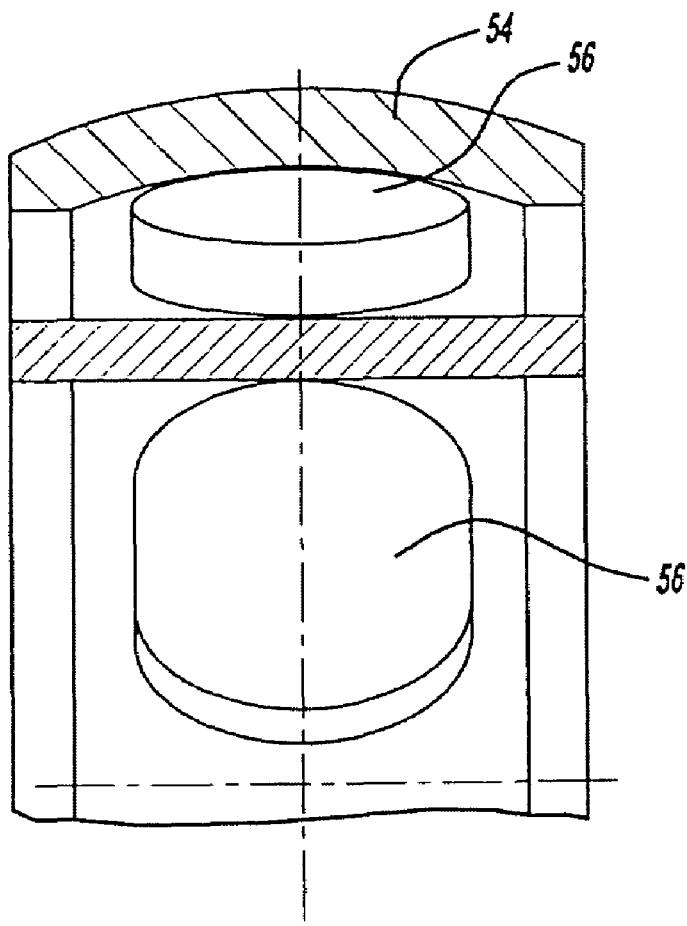
FIG. 14 shows a portion of a cage in partial cross section according to the present invention.
Figure 15:
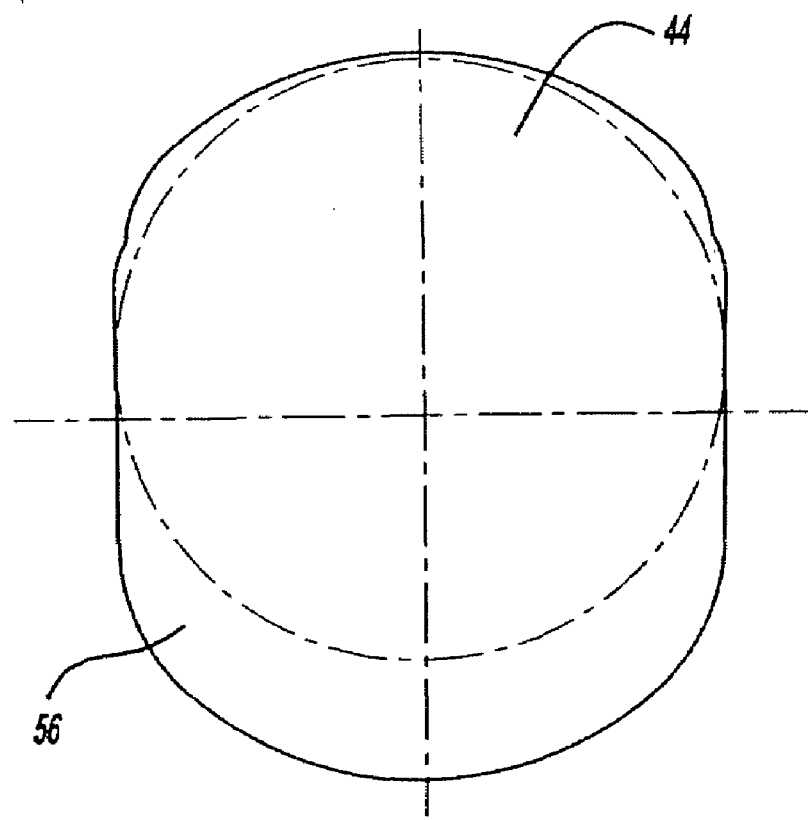
FIG. 15 shows a close-up view of an orifice through a cage according to the present invention.

The constant velocity joint 30 uses a grease cap 58 on one end. The grease cap 58 generally has a cup shaped appearance. The grease cap 58 is generally made of a metal material. However, any, plastic, rubber, ceramic, composite material, and the like may also be used. The cap 58 is press fit or connected to the outer surface of the outer race 32 via one of the circumferential channels 36 on the outer surface. However, any other securing method known may also be used such as fasteners, bonding, etc. The grease cap 58 will insure the grease, which is used as a lubricant, will remain within the constant velocity joint 30. A vent may be placed through the cap 58 to relieve any internal pressure. As shown in FIGS. 3 and 4 the cap also includes a plurality of grooves 70 to allow for rotation of the balls 44 within the constant velocity joint 30 at the high angles.

On an end opposite of the grease cap 58 of the outer race 32 is located a boot cover 60 which generally has a circumferential shape. The boot cover 60 is connected to an outer surface of the outer race 32 either via a circumferential channel 36 on an outer surface thereof or by any other known securing means. The boot cover 60 includes a circumferential channel 62 at an end opposite of the end connected to the outer race 32 for securing a pliable boot 64 therein. The boot cover 60 is generally made of a metal material however any plastic, rubber, ceramic, composite, and the like may be used.

A pliable boot 64 is secured between the boot cover 60 and a stub shaft 66 of the constant velocity joint 30. Any known securing method can be used to hold the boot 64 around the shaft 66 such as a boot clamp, fastener, etc. The pliable boot 64 is generally made of a urethane material. However, any other pliable material such as fabric, plastic, or rubber may also be used for the constant velocity joint boot 64 as long as it is capable of withstanding the high temperature and high rotational speeds of the constant velocity joint 30. It should be noted that the boot 64 is arranged such that the boot 64 is set within the outer circumference of the cage 54. This will allow the boot 64 to move closer to the center line of the constant velocity joint 30 thus decreasing the package size, reducing the stress on the boot 64 and reducing the likelihood of boot failure and constant velocity joint failure. FIG. 1 shows the constant velocity joint 30 at an equilibrium position and shows the boot 64 within the outer diameter of the cage 54. FIG. 2 shows the boot 64 when the constant velocity joint 30 is at a high angel, i.e., approximately 15 degrees. The boot 64 is still within the outer diameter of the cage 54 while also being closer to the centerline of the joint 30, thus reducing any boot stress.

Stub shaft 66 is fixed, via splines 50, to the inner race 46 of the constant velocity joint 30. The stub shaft 66 generally is solid and is usually welded to a tube 68 on one end thereof. The stub shaft 66 and propeller shaft tube will pass through the inner bore 34 of the outer race 32 during the event of a collision thus reducing the forces in the collision and absorbing energy as it collapses. It should be noted that in one aspect, the pitch circle diameter (PCD) and the size of the balls 44 are predetermined in such a way to allow a balance to occur such that the inner race 46 and balls 44 will plunge from the outer race 32 during a crash incident, thus allowing the shaft 66 and tube-like members to collapse therein.

The axially opposed ball tracks 38 and 52 are aligned on the outer race 32 and inner race 46 in construction with the double offsets. The removal of the outer race spherical contact surfaces and the judicious choice of the PCD and ball size permit a large improvement in efficiency while also improving durability. Predetermined ratios are contemplated with the constant velocity joint 30 as described above. A ratio C1 which is the ball diameter divided by the pitch circle diameter should be greater than or equal to 0.217 but less than or equal to 0.275 in an eight ball unit as shown here. However, in a three plus three joint the C1 ratio could be greater than or equal to 0.217 and less than or equal to 0.318. It should be noted that if the C1 ratio is too large there will be a reduction in the cage 54 and inner race 46 strength and a loss of efficiency due to increased ball 44 sliding during the constant velocity joint 30 movement. However, if the ratio C1 is too small problems associated with assembling the inner race 46 into the cage 54 will occur. Furthermore, there will also be durability problems due to a lack of track edge support and reduced ball diameter. The lower ratio promotes ball rolling and thus increases efficiency of the constant velocity joint 30.

A ratio X1 is defined as the axial offset divided by the pitch circle diameter and should be within the range of greater than or equal to 0.06753 while being less than or equal to 0.135. If the X1 ratio is too big the constant velocity joint 30 will lose efficiency due to higher ball and cage forces. The larger variation of the ball path may also force an increase in the outside diameter of the outer race 32 to maintain adequate strength of the constant velocity joint 30. The larger ratio may also reduce track edge support at larger articulation angles as found in many current sport utility vehicles (SUVs). However, if the X1 ratio is too small there will be inadequate steering forces thus inhibiting the correct operation of the constant velocity joint 30. Additionally, a small X1 ratio tends to flatten the track and promotes better rolling behavior thus improving the efficiency of the constant velocity joint 30.

Yet another ratio Y1 that is defined as the radial offset divided by the pitch circle diameter should be greater than or equal to 0.188. If this Y1 ratio is too small a larger variation of the ball path may force an increase in the outside diameter of the outer race 32 to maintain adequate strength of the constant velocity joint 30. A small Y1 ratio may also reduce track edge support at larger articulation angles thus reducing the durability of the constant velocity joint 30. A larger Y1 ratio flattens the track and improves efficiency by promoting better rolling behavior of the balls 44.

Therefore, the present invention of a high angle, high speed constant velocity joint 30 uses a combination of innovations to create a smaller, more reliable and more efficient joint. The constant velocity joint 30 has a smaller part package given a set capacity, while also reducing the weight of the constant velocity joint 30. The constant velocity joint may be at least twice as efficient as the standard high angle joint and will be more reliable thus increasing satisfaction of automotive manufacturers while reducing the number of joint failures and warranty issues thereafter. It should be noted that various parameters such as the radial offset, the axial offset and the pitch circle diameter may be adjusted to achieve specifically tuned objectives for the constant velocity joint 30 such as but not limited to the amount of articulation angle needed or required for the constant velocity joint 30 in the drive train system. The use of the smaller diameter and reduced width outer race 32 will also reduce the cost and complexity of assembling the constant velocity joint 30 for the automotive manufacturers thus reducing overall costs of the automotive vehicle. Hence, the high angle, i.e., greater than or equal to nine degree, high speed fixed constant velocity joint 30, has a better efficiency and more reliability than conventional high speed constant velocity joints that run at high temperatures thus causing premature boot and grease failures. The problem of temperature-based boot failures increases at higher angles, hence the current design limitations of the conventional constant velocity joint need to be corrected to increase joint reliability and satisfaction. The higher temperatures and speed will produce higher stresses on the boot and contribute to many early failures of the constant velocity joint. Therefore, the present invention of the high speed, high angle constant velocity joint 30 overcomes these problems by the elimination of the spherical cage support surface on the outer race 32 in combination with a plurality of axially opposed tracks 38, 52 each of the tracks 38, 52 having a double offset therein. This will allow for high angles and while also promoting better efficiency and durability of the constant velocity joint 30 via better ball rolling within the joint 30.

Figure 24:
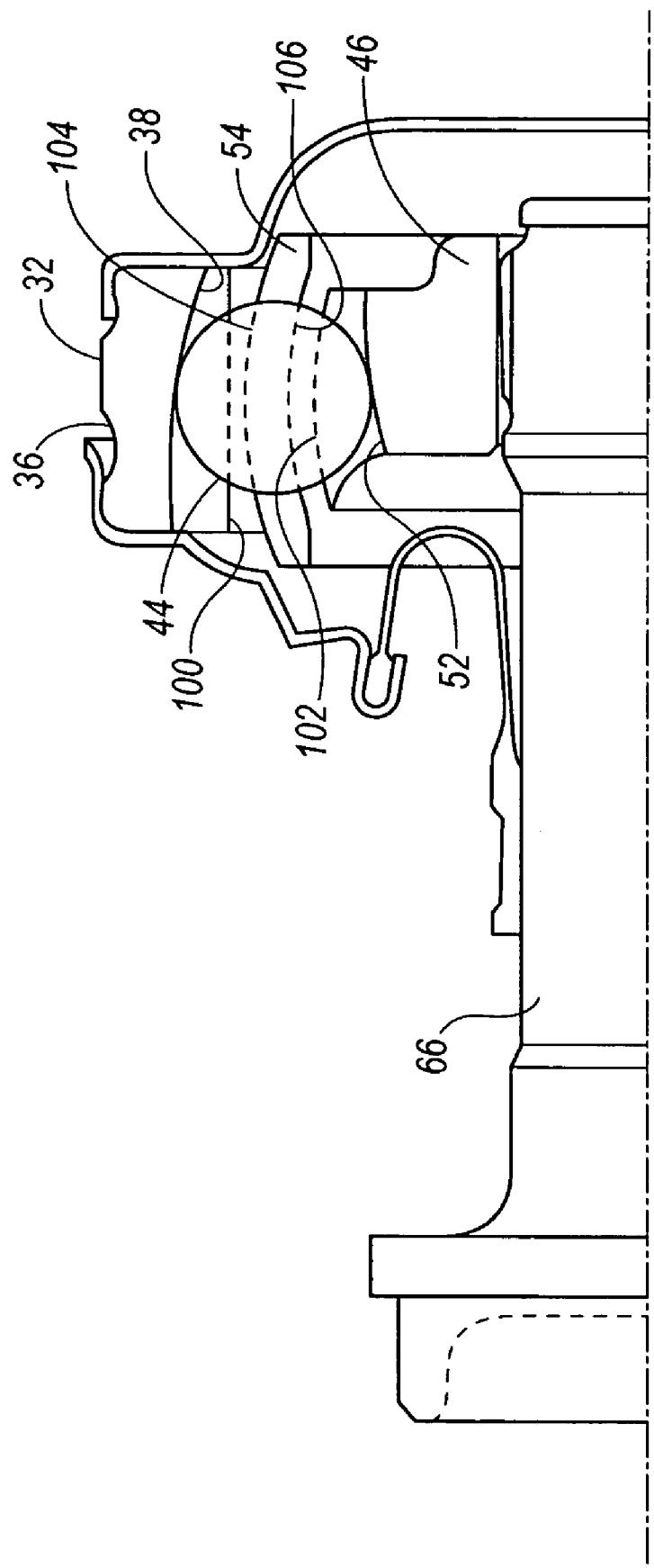
FIG. 24 is a schematic view of the CV joint according to an embodiment of the present invention.
Figure 25:
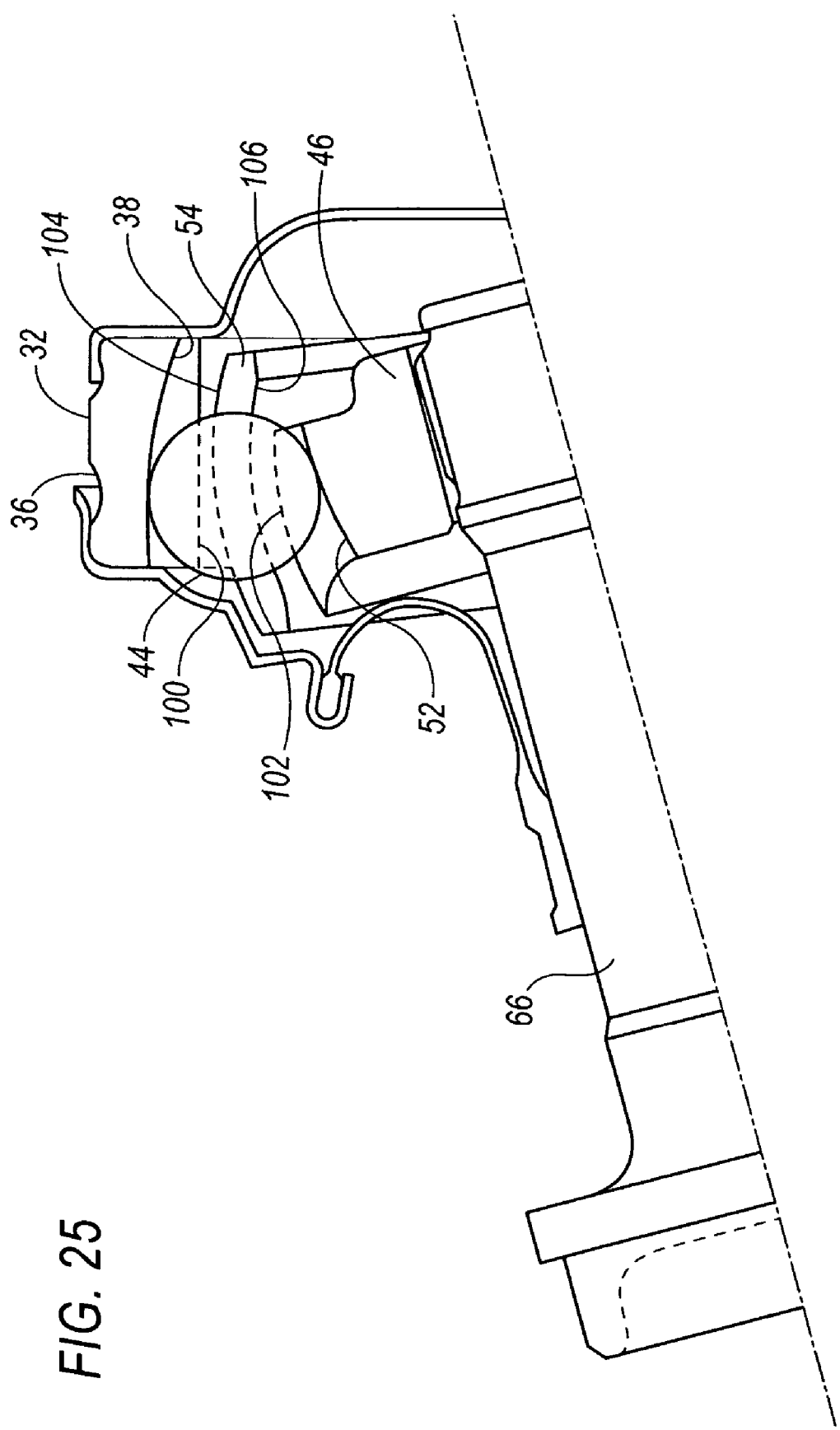
FIG. 25 is a schematic view of the CV joint according to FIG. 24, at an articulation angle.

Referring now to FIGS. 24 and 25, another aspect of the present invention is shown and described. In FIG. 24, an aspect of the present invention directed toward supporting cage 54 is shown and described when stub shaft 66 is at a zero angular position. As described in previous aspects, the implementation of axially opposed tracks 38, 52 minimizes force along an axis of rotation of the constant velocity joint 30. Specifically, tracks 38, 52 angled in one orientation tend to result in a force generation in one axial direction while tracks 38, 52 angled in a second orientation tend to result in a force generation in an opposite axial direction. The net result is a minimized, reduced or alleviated overall force along the axial direction on the cage 54. Accordingly, the amount of support needed to center and support the cage 54 and prevent it from becoming dislodged from the other members of the constant velocity joint is minimized through the implementation of oppositely oriented tracks 38, 52.

In the aspect described in FIG. 24, cage 54 is positioned between outer race 32 and inner race 46 in a non-supporting arrangement. More specifically, upper surface 104 and lower surface 106 of the cage 54 do not prohibit movement of the cage 54 in the radial or axial direction. The cage 54 is generally constrained by the contact of the balls 44 within the orifices 56. In one aspect, upper surface 104 and lower surface 106 of the cage 54 do not contact surface 100 of outer race 32 or surface 102 of inner race 46. In other words, the cage windows, outer race, inner race and balls interrelate to center and support the cage. As shown in FIG. 25, this non-supporting arrangement exists whether stub shaft 66 is at a zero angle position or a high angle position. Accordingly, in one aspect, cage 54 essentially floats in an unsupported fashion between inner race 46 and outer race 32. The balance of forces created by the different angular orientations of tracks 38, 52 provide support in the axial direction to center and support the cage 54 and other components. Of course, although the present invention is described in connection with using this balance of forces to support and center cage 54, it will be readily understood by one skilled in the art that other means of centering and supporting may be employed to maintain cage 54 at a center and supported position which may not include the outer race 32 or inner race 46. It should also be understood that the lack of support provided by outer race 32 or inner race 46 may only be in the axial or a radial direction.

Figure 26:
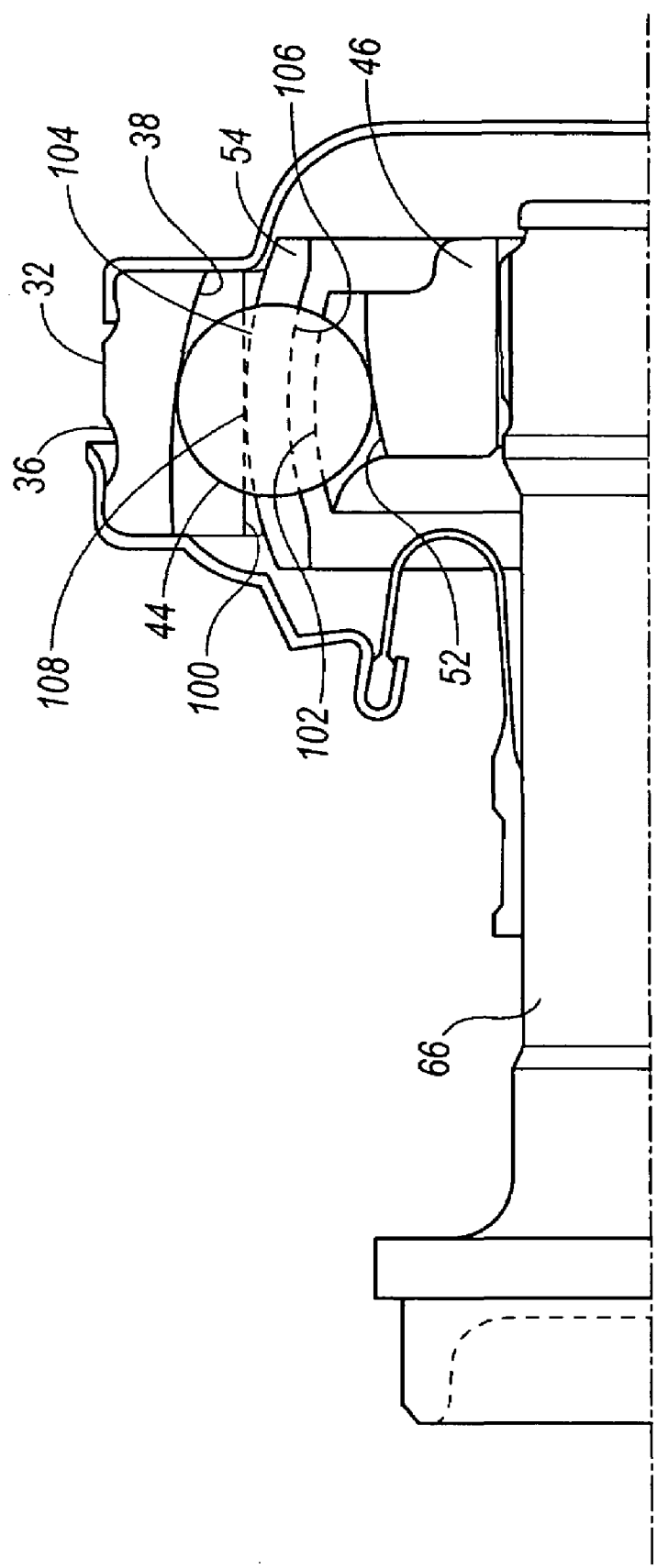
FIG. 26 is a schematic view of the CV joint according to an embodiment of the present invention.
Figure 27:
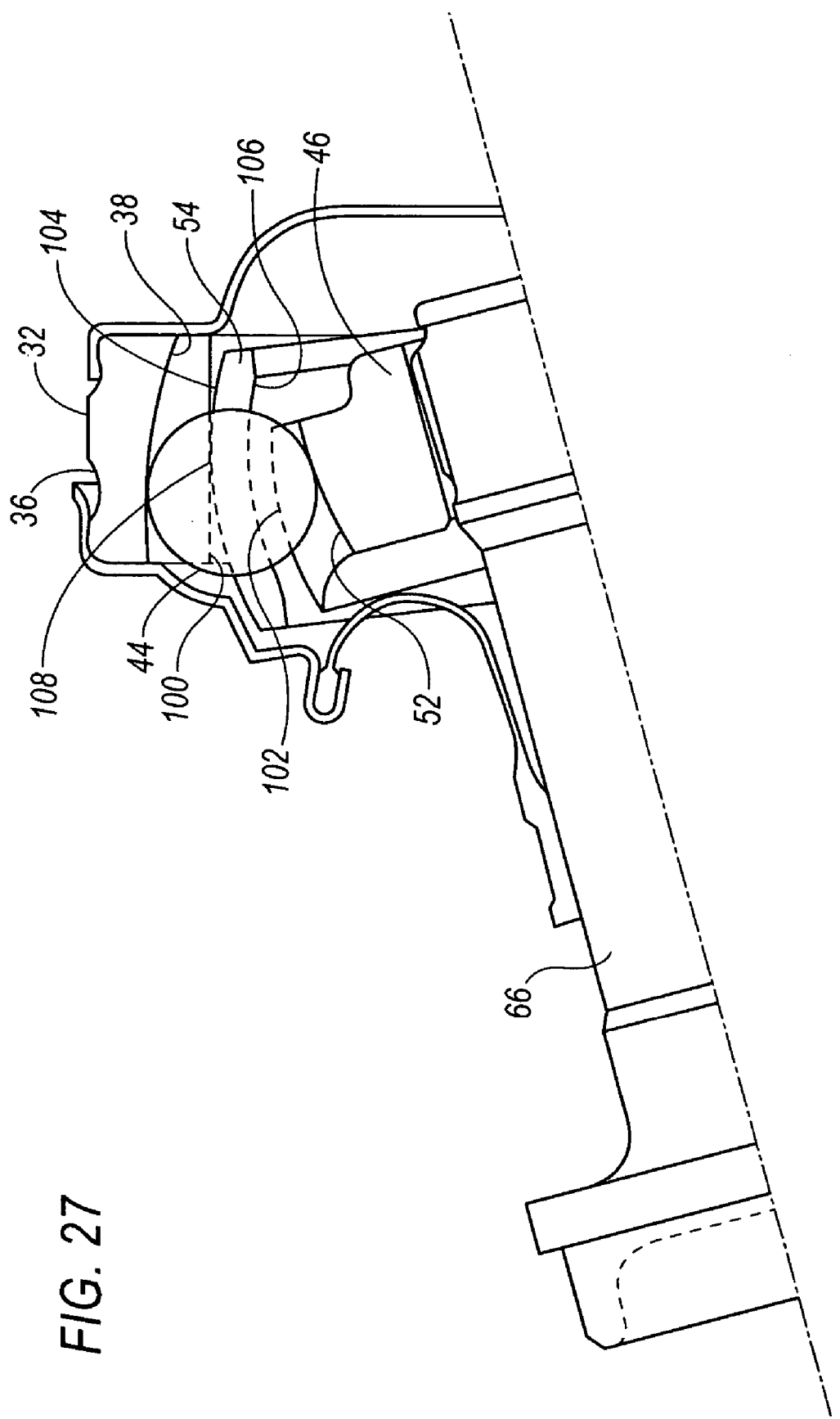
FIG. 27 is a schematic view of the CV joint according to FIG. 26, at an articulation angle.

In FIGS. 26 and 27, another aspect of the present invention is shown and described. In FIG. 26, another aspect of the present invention directed toward supporting cage 54 is shown when stub shaft 66 is at a zero angle position. In FIG. 26, upper surface 104 of cage 54 has a single point contact 108 with the surface 100 of outer race 32. Such a contact position provides minimal support in the axial direction. However, this contact acts to center the cage 54 and prevent radial movement. The single point contact 108 comprises a minimal amount of surface area. Lower surface 106, however, is in a non-supporting arrangement with inner race 46. More specifically, lower surface 106 of cage 54 does not contact surface 102 of inner race 46. As shown in FIG. 27, when stub shaft 66 moves to a high angle position, a single point contact 108 is still maintained between upper surface 104 and surface 100. Additionally, this single point contact 108 acts to center the cage 54 and prevent movement in the radial direction.

Figure 28:
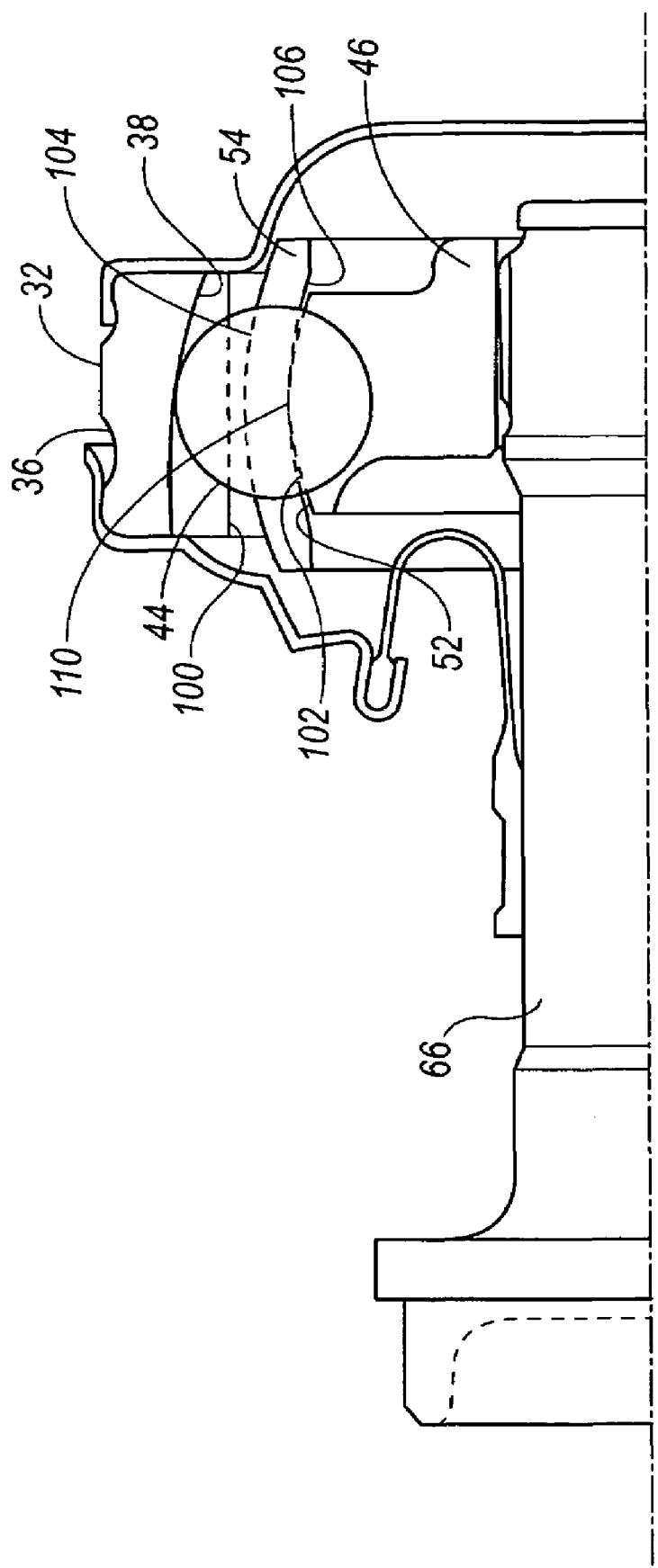
FIG. 28 is a schematic view of the CV joint according to an embodiment of the present invention.
Figure 29:
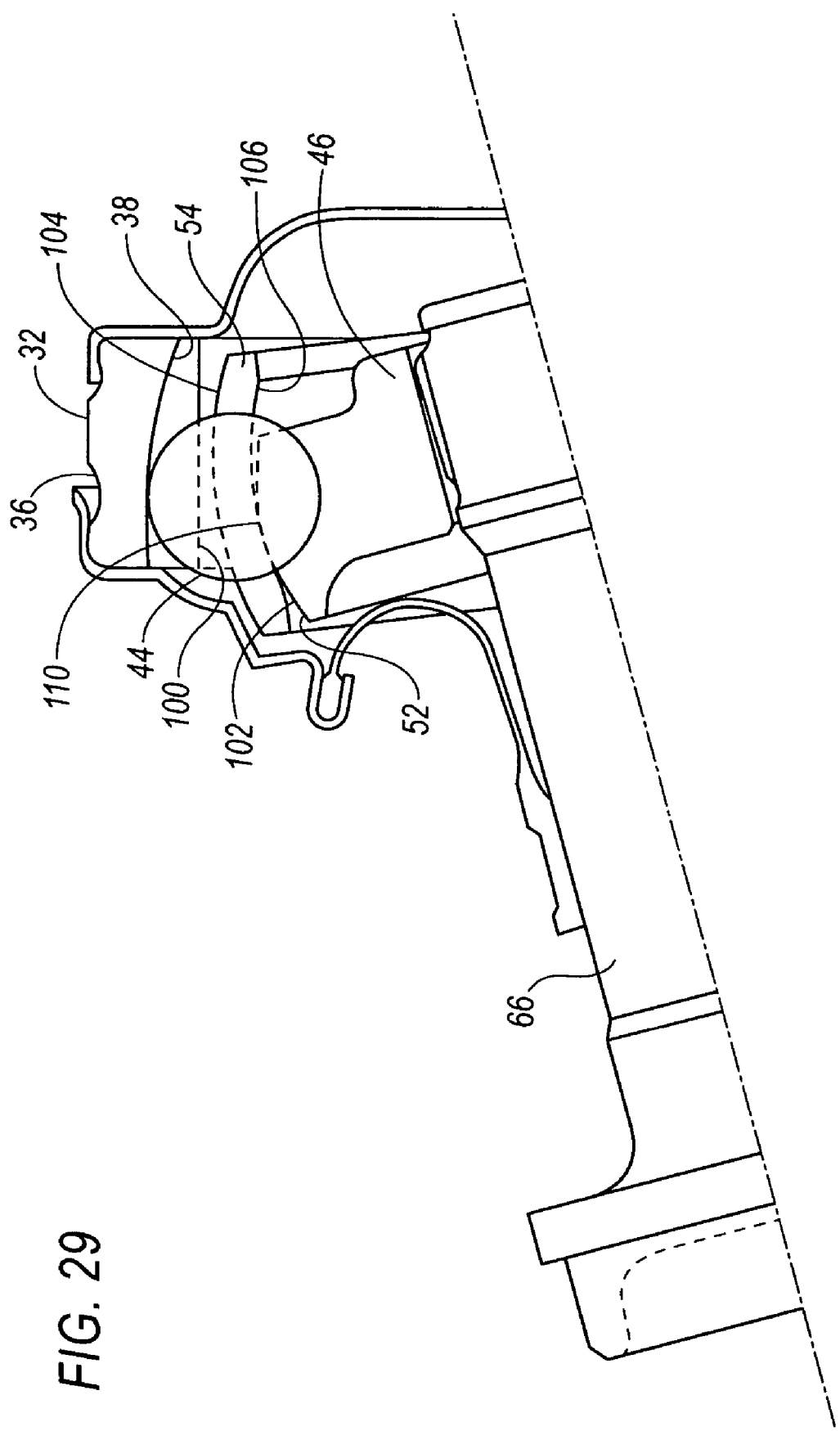
FIG. 29 is a schematic view of the CV joint according to FIG. 28, at an articulation angle.

In FIGS. 28 and 29, another aspect of the present invention is shown and described. In FIG. 28, another aspect of the present invention directed toward supporting cage 54 is shown when stub shaft 66 is at a zero angle position. In FIG. 28, lower surface 106 of cage 54 has a point contact 110 with the surface 102 of inner race 46. As before, the single point contact provides additional support to center and support the cage 54. Outer race 32, however, is in a non-supporting relationship with the cage 54. FIG. 29 shows this single point 110 relationship between cage 54 and inner race 46 when the stub shaft 66 is at a high angle position.

Figure 30:
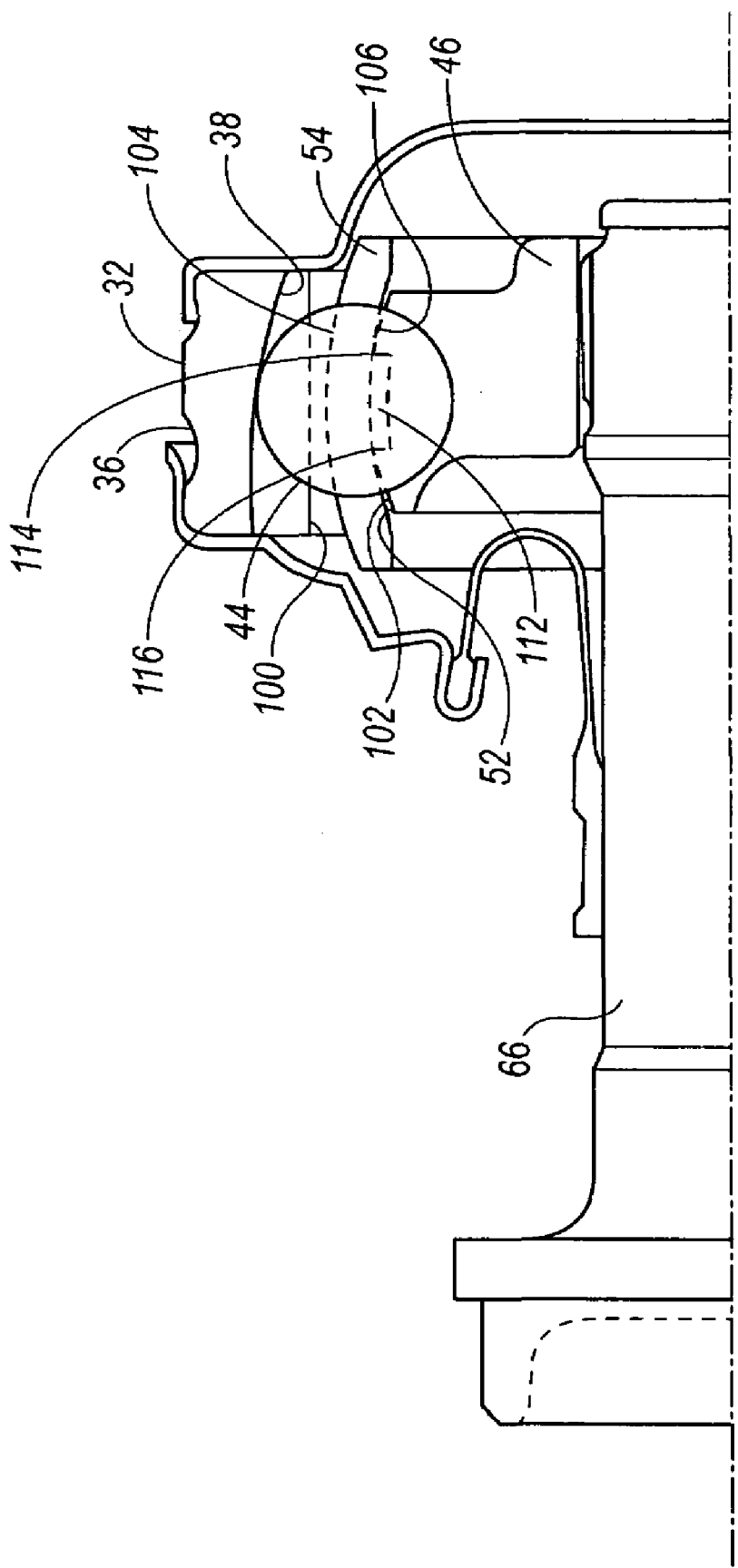
FIG. 30 is a schematic view of the CV joint according to an embodiment of the present invention.
Figure 31:
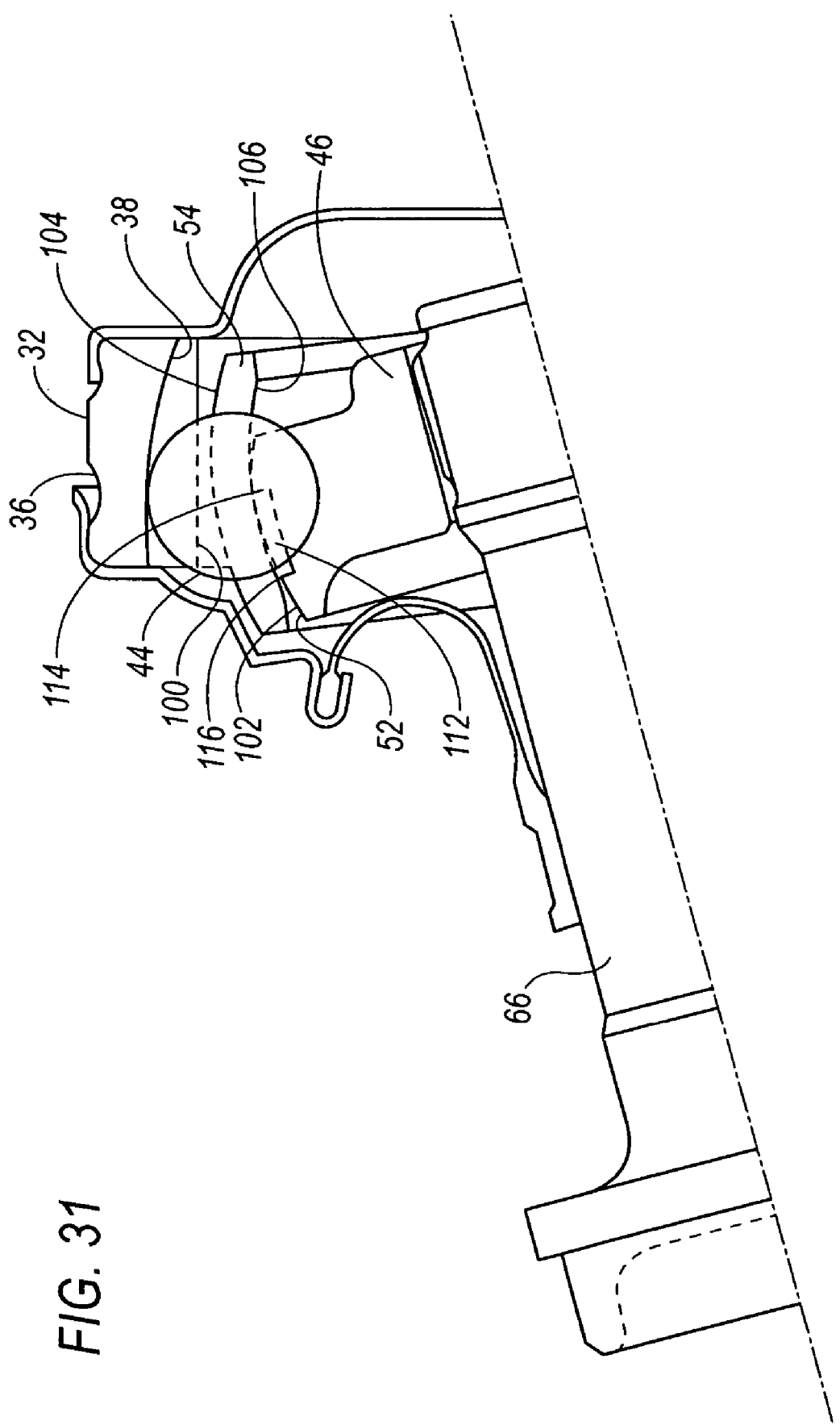
FIG. 31 is a schematic view of a CV joint similar to FIG. 30, at an articulation angle.
Figure 32:
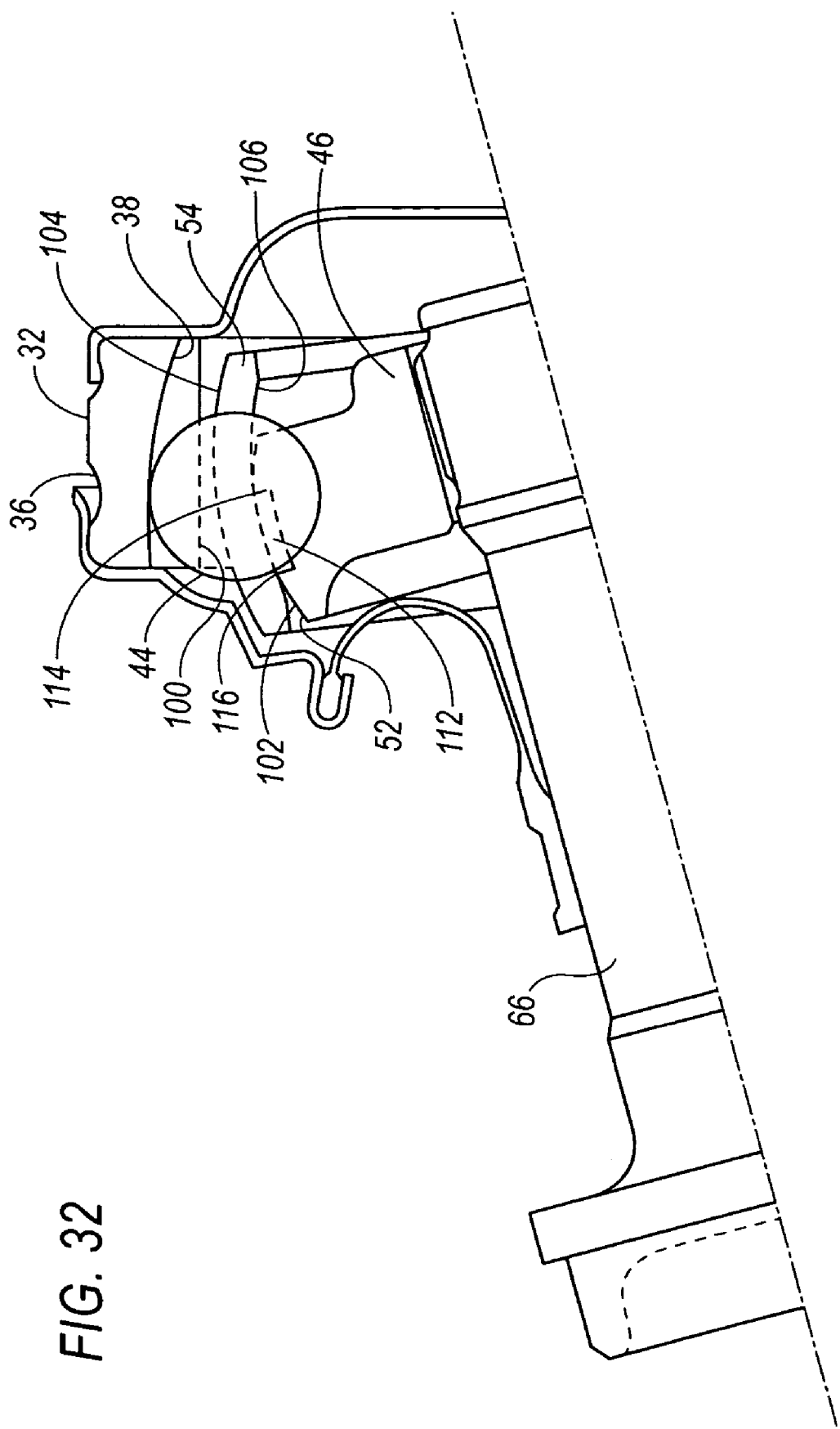
FIG. 32 is a schematic view of another CV joint similar to FIG. 30, at an angle.

In FIGS. 30–32, another aspect of the present invention is shown and described. In FIG. 30, another aspect of the present invention directed toward supporting cage 54 is shown when stub shaft 66 is at a zero angle position. In FIG. 30, a cutout portion 112 is shown in surface 102 of inner race 46. The cutout portion 112 minimizes the amount of exposed surface area that can contact surface 106 of cage 54. More specifically, as shown in FIG. 30, surface 106 of cage 54 contacts surface 102 of inner race 46 only at point contacts 116 and 114. By virtue of the cutout portion 112, surface area that would otherwise create a contacting relationship between cage 54 and inner race 46 is removed. As a result, cage 54 is supported and center by only point contacts 114 and 116. It is further contemplated by the present invention to alternately include the cutout portion 112 in the surface 100 of the outer race 32. Accordingly, surface 104 of the cage 54 would be minimized and point contacts 116 and 114 would be between surface 104 of the cage 54 and the surface 100 of the outer race 32.

Referring to FIG. 31, in one embodiment upper surface 104 of cage 54 does not contact surface 100 of outer race 32 when the stub shaft is at a high angle position. More specifically, in the illustrated embodiment, the position of point contact 116 on inner race 46 moves out of contact with surface 106 of cage 54. As such, at a high angle position, only point contact 114 provides additional support to cage 54. However, as shown in FIG. 32, the length of cutout portion 112 as well as the overall geometry of the cage 54, inner race 46 and outer race 32 may be selected such that, when in the high angle position as shown in the figure, both point contacts 114 and 116 exist between inner race 46 and cage 54.

The present invention has been described in an illustrative manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A constant velocity joint, comprising:
   an outer race having a bore with an inner surface, the inner surface having a plurality of generally spherically shaped outer ball tracks;
   a cage arranged within the bore of the outer race;
   an inner race having an outer surface, the outer surface having a plurality of generally spherically shaped inner ball tracks, a first group of the inner and outer ball tracks opening in one axial direction, and a second group of the inner and outer ball tracks opening in an opposite axial direction;
   a plurality of balls each arranged within a window of the cage and a corresponding inner and outer ball track;
   a shaft connected to the inner race; and
   a boot having a portion positioned within said cage;
   wherein the cage windows, outer race, inner race, and balls interrelate to center and support the cage;
   wherein the cage remains in a non-supported state with respect to the inner surface of the outer race and the outer surface of the inner race through a range of articulation between a no angle and a high angle position of the shaft.

2. The constant velocity joint according to claim 1, wherein the first and second groups of tracks are adapted to center and support the cage by way of the balls within the cage windows.

3. A constant velocity joint, comprising:
   an outer race having a bore with an inner surface, the inner surface having a plurality of generally spherically shaped outer ball tracks;
   a cage arranged within the bore of the outer race;
   an inner race having an outer surface, the outer surface having a plurality of generally spherically shaped inner ball tracks, a first group of the inner and outer ball tracks opening in one axial direction, and a second group of the inner and outer ball tracks opening in an opposite axial direction;
   a plurality of balls each arranged within a window of the cage and a corresponding inner and outer ball track;
   a shaft connected to the inner race; and
   a boot having a portion positioned within said cage;
   wherein the cage does not contact the inner surface of the outer race or the outer surface of the inner race through a range of articulation between a no angle and high angle position of the shaft.

4. The constant velocity joint according to claim 3, wherein the first and second groups of tracks are adapted to center and support the cage by way of the balls within the cage windows.

* * * * *